United States Patent [19]

Crill

[11] Patent Number: 4,924,960

[45] Date of Patent: May 15, 1990

[54] HIGHLY RELIABLE REMOTE CONTROL SYSTEM

[75] Inventor: Rikk J. Crill, Longmont, Colo.

[73] Assignee: Robal, Inc., Boulder, Colo.

[21] Appl. No.: 256,735

[22] Filed: Oct. 12, 1988

[51] Int. Cl.$^5$ ............................................. B60K 31/00
[52] U.S. Cl. ................................................... 180/333
[58] Field of Search ...................... 180/79.1, 165, 168, 180/169, 179, 315, 333, 170, 174; 364/424, 426; 123/352; 318/628, 663

[56] References Cited

U.S. PATENT DOCUMENTS

| | | | |
|---|---|---|---|
| 3,022,850 | 2/1962 | Bidwell et al. | 180/77 |
| 3,814,199 | 6/1974 | Jones | 180/333 |
| 4,072,206 | 7/1978 | Larson et al. | 180/105 E |
| 4,161,726 | 7/1979 | Burson et al. | 340/365 R |
| 4,180,713 | 12/1979 | Gonzales | 180/333 |
| 4,476,954 | 10/1984 | Johnson et al. | 180/333 |
| 4,541,497 | 9/1985 | Riediger et al. | 180/333 |

OTHER PUBLICATIONS

"Fault-Tolerant Design Spans Terrestrial and Space Applications", EDN, Apr. 28, 1988.

CNC—Control For Industrial Robots with a Modular Programming Language, Spur et al., Proc of the Int Symp on Ind Robots, 7th, Oct. 19–21, 1977, published by JIRA (Jpn Ind Robot Assoc), Tokyo 1977, pp. 243–253.

A Microprocessor Environmental Controller for Quadriplegics, Bojanowski et al., Sigcaph Newsl. (USA), No. 24, pp. 47–51, Oct. 1978.

Joystick Interfaces, Ciarcia, BYTE (USA), vol. 4, No. 9, pp. 10, 12, 14–16, 18, Sep. 1979.

Joystick Interface for Microprocessor Systems, Tully, et al., New Electron (GB), vol. 12, No. 4, p. 48, Feb. 20, 1979.

Single-Shot Control for Joystick, Bland et al., IBM Tech. Discl. Bull. (USA), vol. 19, No. 10, pp. 3897–3898, Mar. 1977.

Digital Encoding of Joystick Position, Holloway, IBM Tech. Discl. Bull. (USA), vol. 19, No. 9, pp. 3612–3613, Feb. 1977.

*Primary Examiner*—Richard A. Bertsch
*Attorney, Agent, or Firm*—Robert E. Harris

[57] ABSTRACT

A highly reliable remote control system is disclosed that is particularly well adapted for controlling a vehicle, and, more particularly, for controlling the throttle, brake, steering and transmission mechanisms of a motor vehicle. The system includes a remote manipulator that enables control of the adapted vehicle remotely with one hand and with minimal control force and range of motion, with the manipulator controlling a plurality of actuators through interfacing redundant digital/analog electronics. The remote manipulator may be a bilateral input device utilizing a plurality of pressure sensors, but could also be a two-axis joystick, with the manipulator, in conjunction with an adjacently positioned transmission controller, controlling linear and rotary actuators powered by electric motors to effect throttle, brake, steering and transmission control of a motor vehicle adapted to include the remote control system as a part of the overall vehicle controlling system.

22 Claims, 3 Drawing Sheets

Fig_1
PRIOR ART

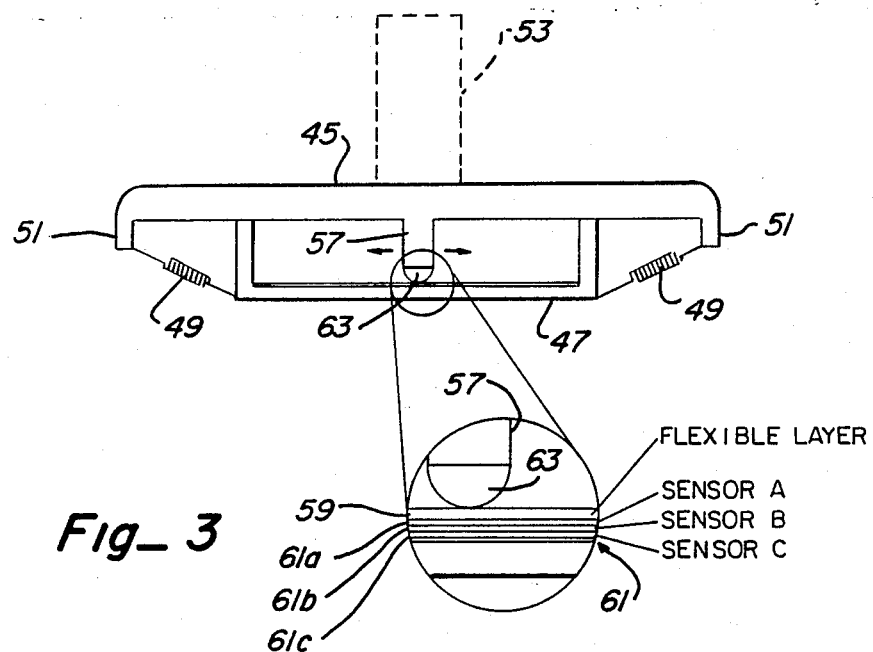
Fig_3
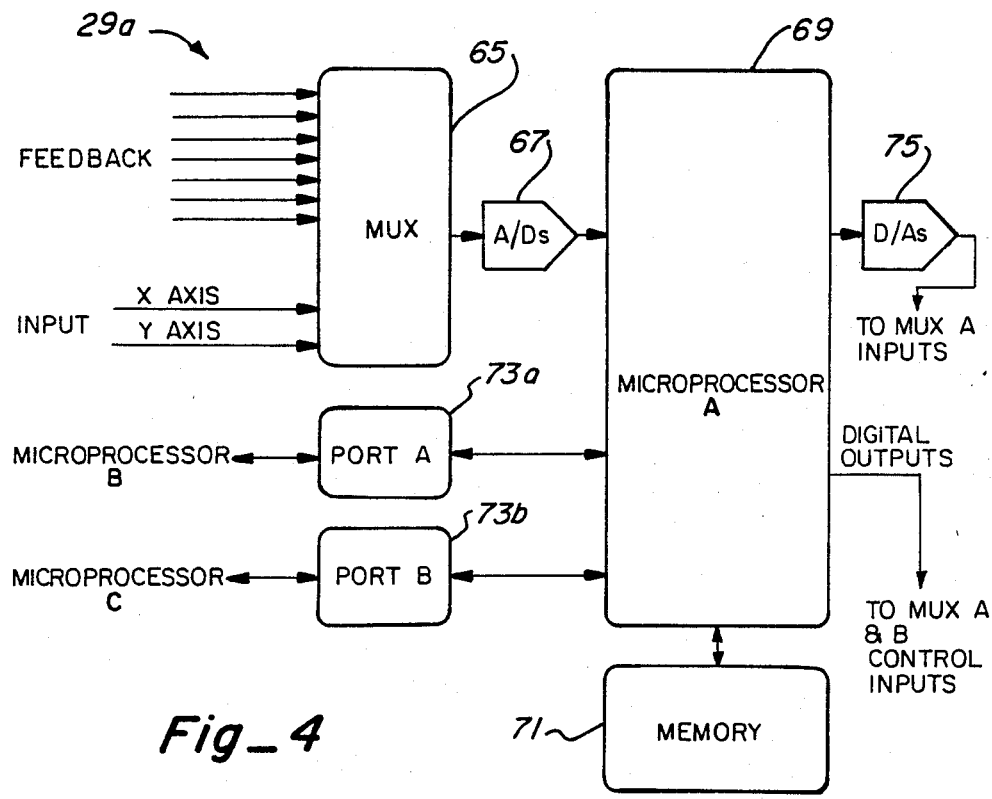
Fig_4

HIGHLY RELIABLE REMOTE CONTROL SYSTEM

FIELD OF THE INVENTION

This invention relates to a remote control system, and, more particularly, relates to a remote control system that is particularly useful for remotely controlling a motor vehicle.

BACKGROUND OF THE INVENTION

Vehicle controls have been developed and refined over a period of years to fulfill a variety of needs. With respect to a motor vehicle, such as an automobile, it is essential that the direction and speed of movement be controlled. As is well known, the direction of an automobile is now normally controlled by a rotatable steering wheel, the speed is normally controlled by foot pedals which include an accelerator (throttle) for increasing (or maintaining) the speed of the vehicle and a brake for decreasing the speed (or stopping) the vehicle, and a transmission control which controls the gear selected (or range of gears for an automatic transmission), with the steering wheel, accelerator, brake and transmission control being normally positioned inside the passenger compartment so as to be readily available to the driver.

While the normal mode of control for a motor vehicle, such as an automobile, has been satisfactory for most individuals, improvements are still felt to be warranted, including, for example, enabling remote operation from a point distant from the normal driver position, or even remote operation from outside the vehicle.

In addition, some handicapped individuals have not been able to effectively control a motor vehicle using the now normally accepted control system. With respect to handicapped individuals, efforts have heretofore been made to develop different control systems for a vehicle that would enable certain handicapped individuals to control such a vehicle.

Such efforts have included, for example, a modified control system using mechanical controls to enable paraplegics who have lost the use of their lower extremities to manipulate the throttle and brake by hand with no change in steering (since the steering wheel is now normally rotated by hand).

A simple hand-operated "T" handle has also been developed for use by handicapped individuals still capable of rotating a conventional steering wheel, with the "T" handle controlling the throttle and brake through the use of pneumatic servos.

An adaptive control system for a vehicle has also been heretofore developed for use by certain quadriplegics capable of limited arm motion. In at least one such system, a steering wheel of reduced size has been used in conjunction with a pivotable pedestal having the steering wheel mounted thereon so that pivoting movement of the pedestal in one direction (usually by pushing the pedestal forward) causes the vehicle to be accelerated and pivoting movement in the opposite direction causes the brake to be applied. For higher level quadriplegics unable to exert the arm motion necessary for rotation of the steering wheel, a modification has also been heretofore developed which replaces the steering wheel with a tri-pin grip.

Still another control system has been heretofore developed for use by high level quadriplegics which utilizes a small joystick to control the three primary vehicle control functions (i.e., throttle, brake and steering) with the system depending upon utilization of hydraulic servos involving a large and complex array of pumps and valves.

The control system utilized for the lunar rover (Apollo moon missions) allowed the operating astronaut to control acceleration, braking and steering with one hand through the use of a rather complicated hand controller having potentiometers mounted therein to sense the position of the controller and drive wheel connected electric motors to effect propulsion and steering of the vehicle.

A remote control system has also been heretofore developed for a motor vehicle with the control system being particularly useful in allowing control to be effected with little arm movement and with the control system being therefore particularly well suited for use by handicapped individuals such as high level quadriplegics, and with the control system including a remote controller having a two-axis joystick, actuators for effecting direction and speed control, and electronic interfacing between the joystick and actuators (see U.S. Pat. No. 4,476,954).

While heretofore known and/or utilized modified control systems have allowed some flexibility in operator positioning and/or have allowed some handicapped individuals to operate a motor vehicle, further improvements in such systems could still be utilized.

SUMMARY OF THE INVENTION

This invention provides an improved remote control system that is highly reliable, with the control system preferably including redundant digital/analog electronics, as well as an improved manipulator. The controller is useful in a variety of man-machine interface systems requiring high reliability, and is particularly useful for remote control utilizing little arm movement.

It is therefore an object of this invention to provide an improved remote control system.

It is still another object of this invention to provide an improved remote control system for a motor vehicle.

It is yet another object of this invention to provide an improved remote control system having high reliability using at least one of digital/analog electronics and redundancy.

It is still another object of this invention to provide an improved remote control system for a motor vehicle suitable for control remote from the driver position.

It is still another object of this invention to provide an improved remote control system for a motor vehicle suitable for use by handicapped individuals such as high level paraplegics.

It is still another object of this invention to provide an improved device for initiating control of a vehicle.

It is still another object of this invention to provide an improved remote control system having a bilateral input device for initiating control.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 3 is a side view of the manipulator shown in FIG. 2; and

FIG. 4 is a block diagram illustrating, in greater detail, a microprocessor subsystem as shown in FIG. 2.

DESCRIPTION OF THE INVENTION

Remote control systems are well known today and have been heretofore suggested and/or utilized in conjunction with a variety of devices, including remote controlled vehicles. One arrangement for controlling a motor vehicle utilizing a joystick as the manipulator is disclosed and claimed in U.S. Pat. No. 4,476,954, owned by the assignee of this invention, and hereby included by reference herein, with this invention being a further development with respect to the device shown in U.S. Pat. No. 4,476,954.

The act of normal driving of an automobile involves an operator acting across an interface to control the vehicle. This is a complex, semi-skilled, neuromuscular function, involving visual, auditory and vestibular sensation, processing of information, and execution of commands to modulate vehicle velocity and direction.

The control interface of an automobile has been designed to accommodate the capabilities and limitations of a driver without appreciable handicaps that would prevent normal use of arms and legs, and the driver is normally seated in the automobile so as to have a view of the immediate area ahead of the automobile. Early in automotive history, it became standard for the operator to control the automobile using foot pedals for speed control, a hand wheel for direction control, and some type of transmission control (which normally included a gear shift and clutch or, later an automatic transmission shift lever). Still today, despite dimensional variations, standard automobiles in common usage have a steering wheel mounted on a column with spaced accelerator and brake pedals at the base of and somewhat offset with respect to, the steering column, as well as some type of transmission control.

For remote control, some device must therefore be introduced to either augment the output capabilities of the driver or to modify the input requirements of the vehicle. Due to the physical limitations often present in severely handicapped cases, for example, special considerations in overcoming man-machine interface problems were required in providing a satisfactory control system. Among such considerations was that only minimal operator control input force and range of motion of one hand would be available for use, and that such minimal force and motion would have to be utilized to develop sufficient force to control a throttle, brake and steering functions in the adapted motor vehicle.

In addition, it has been found desirable, and in some cases necessary, that control of a vehicle be achieved from some point other than heretofore normally utilized by the vehicle operator, with such remote control, for example, being achieved from a different seat within the vehicle or at a location outside the vehicle.

Figure 1:
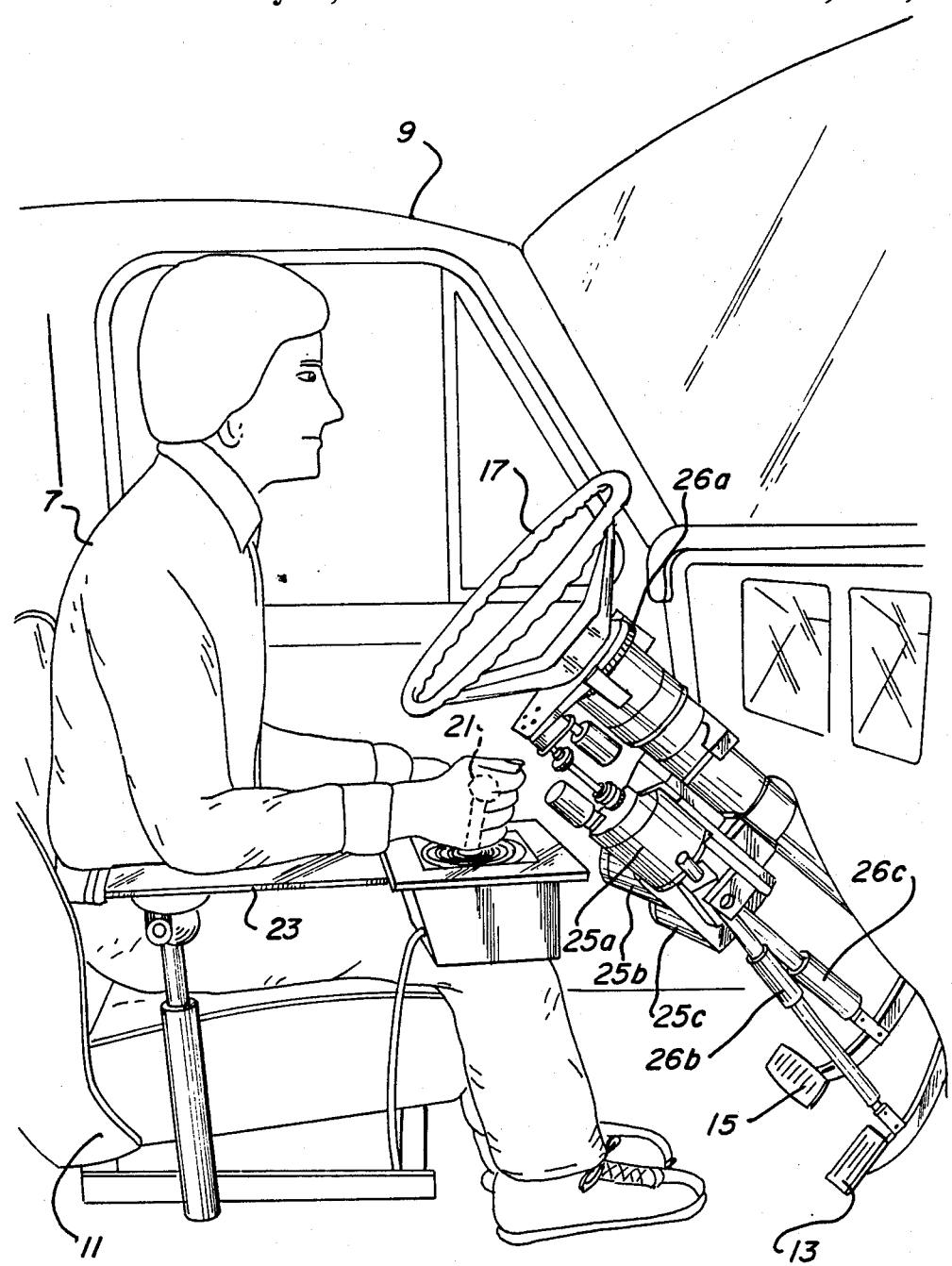
FIG. 1 is a perspective presentation illustrating a driver positioned within a motor vehicle for remotely controlling the vehicle using a joystick as taught in U.S. Pat. No. 4,476,954.

FIG. 1, taken from U.S. Pat. No. 4,476,954, illustrates a motor vehicle operator 7 seated within motor vehicle 9 in normal driver seat 11. When so seated, operator 7 could operate the vehicle in conventional manner using the feet to actuate throttle pedal 13 and brake pedal 15, and using the hands to turn steering wheel 17 and position a gear selector (transmission) (the motor vehicle can be a conventional automobile or van, for example, having an automatic transmission).

As also indicated in FIG. 1, the motor vehicle may be modified to allow an operator to control steering and speed by means of two-axis joystick 21 positioned at an arm support 23. This arrangement is utilized in the device shown and claimed in U.S. Pat. No. 4,476,954. As shown therein, the entire control system is installed in the passenger compartment of the standard, or conventional motor vehicle (rather than in the harsh environment that exists in the engine compartment or under the vehicle), and the driver's control input device 21 (joystick) is connected through interfacing analog electronics to a plurality of actuating assemblies to thereby control steering, throttle and brake.

The design of the driver's control input device 21 and its associated hardware evolved from a human factors analysis of the control capabilities and limitations of quadriplegics who have suffered lesions of the spinal cord at the fifth cervical vertebra (C-5). Persons who have suffered such a severe injury have very limited use of their upper extremities. Test results indicated that the C-5 quadriplegic could maintain the best control with the forearm while supported by an arm rest or other similar device which limits effective control motion to a radius of approximately four inches from the neutral point. In addition, motions across the central line of the body (such as those needed to turn a conventional steering wheel) were found to be especially difficult to control. A control resistance of between about eight ounces and two pounds maximum was found, however, to be easily achieved and offered good control "feel" for drivers with different physical capabilities.

The design of the control system was influenced by the need for a compact system which could be readily installed in a wide range of vehicles and readily removed for service or reinstallation in another vehicle. This goal was realized through the use of actuators powered by electric motors and installed entirely within the passenger compartment of the vehicle. As shown in FIGURE 1, this was accomplished using motors 25(a), 25(b) and 25(c) connected with actuators 26(a) (rotary), 26(b) (linear) and 26(c) (linear), respectively, to control rotation of steering wheel 17, operation of accelerator pedal 13, and operation of brake pedal 15, respectively. Analog non-redundant electronics were utilized for interfacing between the joystick and the motors.

Installation of the actuators was accomplished by replacing the stock steering wheel with a modified wheel, bolting the drive package under the dashboard and connecting the brake and throttle actuators to the respective pedal. It was found that such installation could be accomplished in a single day by an average experienced mechanic.

In this invention, digital/analog electronics, utilizing redundancy, were designed in response to the requirement for a flexible, compact and reliable means of translating the input commands of the operator into the control signals which govern the actuator package.

Figure 2:
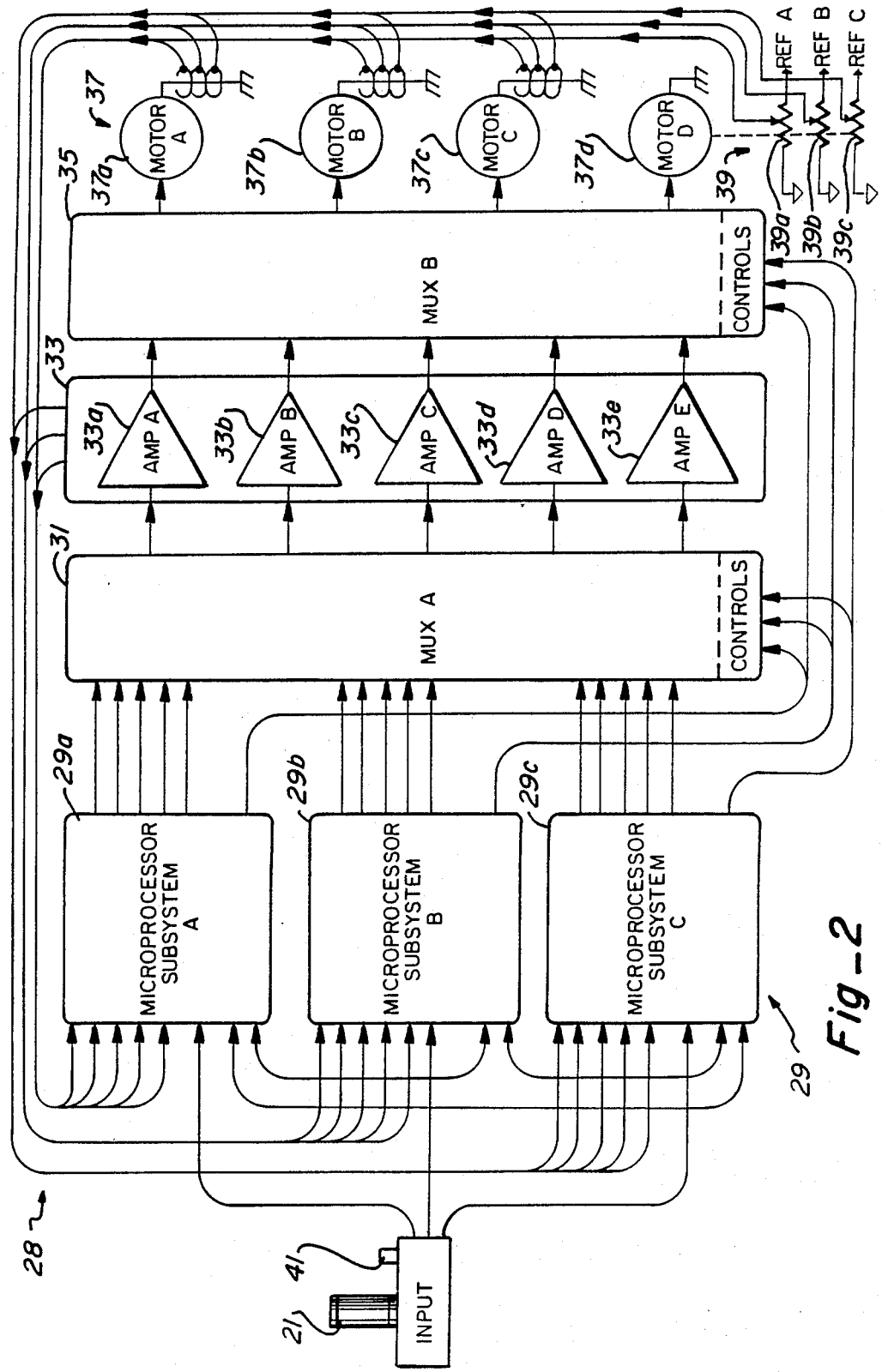
FIG. 2 is a block diagram of a redundant control system for enabling an operator to remotely control a vehicle according to this invention.

As shown in FIG. 2, digital/analog interface system 28 is preferably utilized in this invention to provide a redundancy arrangement established by three identical microprocessor subsystems 29 (designated as microprocessor subsystems 29(a), 29(b) and 29(c) in FIG. 2). It is to be appreciated, however, that while three parallel channels, or subsystems, are indicated, any plural number may be utilized as needed. As also indicated in FIG. 2, the output of remote manipulator 21 is connected in parallel to subsystems 29(a), 29(b) and 29(c). The output of each subsystem is then coupled to multiplexer, or switching arrangement, 31, and switching arrangement 31 controls which signal from the subsystems will be applied to amplifying unit 33 (which includes amplifiers 33(a), 33(b), 33(c), 33(d) and 33(e)).

The outputs from amplifier unit 33 are coupled to multiplexer, or switching arrangement, 35, and switching arrangement 35 controls which signal from the amplifiers is coupled to motors 37. Motors 37 include motor 37(a) (used to control steering), motor 37(b) (used to control the brake), motor 37(c) (used to control the throttle), and motor 37(d) (used to control the transmission). Motor 37(a) is utilized for rotary actuation of the steering mechanism, and motors 37(b), 37(c) and 37(d) are utilized for linear actuation of the brake, throttle, and transmission mechanisms, respectively.

As also indicated in FIG. 2, the current through motors 37(a), 37(b) and 37(c) is sensed and fed back to subsystems 29, while motor 37(d) has potentiometers 39 (designated as potentiometers 39(a), 39(b) and 39(c) in FIG. 2) connected thereto to provide feedback to subsystems 29.

Microprocessor subsystems 29(a), 29(b) and 29(c) receive status information from amplifiers 33, motors 37 and potentiometers 39, and this enables the microprocessor subsystems to detect any failed components. Upon detection of a failed component or components, the microprocessor subsystems provide inputs to multiplexer 31 and/or multiplexer 35 to allow control of motors 37 by the remaining components. The inputs to multiplexers 31 and 35 operate by means of a majority voting circuit which guarantees correct selection of the operable components even in the event of a microprocessor subsystem failure.

Utilizing this interface system, all of the subsystems of subsystem 29 provide inputs for control of steering, throttle, brake and transmission and switching arrangement 31 thus selects which one of each to use. The selected signal is then coupled to an amplifier of amplifier unit 33 (with the signal to amplifier 33(a) being for control of steering, the signal to amplifier 33(b) being for control of brake, the signal to amplifier 33(c) being for control of throttle, and the signal to amplifier 33(d) being for control of transmission). Switching arrangement 35 thus controls application of the signal to the proper motor (i.e., to motor 37(a) for steering, to motor 37(b) for brake, to motor 37(c) for throttle, and to motor 37(d) for transmission).

Amplifier 33(e) is utilized in the event of failure of any other amplifier unit and allows switching arrangement 35 to switch the signal from any of the other four through amplifier 37(e).

Motors 37(a), 37(b), 37(c), and 37(d) can be operated in the manner as disclosed in connection with U.S. Pat. No. 4,476,954 to control associated actuators for steering, brake, and throttle, with transmission control being also effected in the manner similar to that disclosed for the linear actuators shown in U.S. Pat. No. 4,476,954. For transmission control, a separate controller, or manipulator, 41, as indicated in FIG. 2, is preferably utilized adjacent to manipulator 21. Such a controller can be, for example, a series of switches, or a lever, with the input therefrom being connected with microprocessor subsystems 29 to provide the necessary information for actuation of motor 37(d).

In U.S. Pat. No. 4,476,594, operation of the device was achieved by pivoting the joystick forwardly from a normally centered position to depress the accelerator (or throttle), pivoting the joystick rearwardly from the normally centered position to depress the brake pedal, moving the joystick left and right from the normally centered position to turn the steering wheel in the appropriate direction.

While control input device 21 could be a joystick, input device 21 is preferably implemented by means of a bilateral input device. As shown in FIG. 3, the bilateral input device includes an actuator 45 that may be displaced laterally, with respect to a mounting body 47, in any lateral direction (from a central position) by overcoming the bias imposed by springs 49 connected between depending rotary flange 51 of actuator 45 and mounting body 47. To effect such movement, handle 53 may be utilized, as illustrated in FIG. 3.

As also indicated in FIG. 3, actuator 45 includes a pointer 57 that is moved with respect to a flexible layer 59 overlying a sensor unit 61, which sensor unit includes sensors 61(a), 61(b), and 61(c). The free end 63 of pointer 53 contacts flexible layer 59.

When pointer 53 is centrally positioned, no output is provided from the device to the subsystems. However, when pointer 53 is moved, the pressure sensed by sensor 61 causes an output to be produced due to a change of resistance caused by the pointer. In this system, two analog signals are produced (representative of X and Y axis outputs), and these analog systems are processed in the microprocessor subsystems.

The sensors may be, for example, force sensing resistors (i.e., a polymer thick film for sensors) provided by Interlink Electronics, Inc. and having the ability to exhibit a decreasing resistance with increasing force. By thus sensing the force supplied at each point by pointer 53, electrical outputs are provided to the subsystems indicative of the position of the pointer away from the center position, and this is utilized in the subsystems to effect desired changes in direction, speed and transmission.

While it is preferred that bilateral device 21 be utilized with digital/analog electronics as described herein, such device could be utilized with an analog interfacing system such as described in U.S. Pat. No. 4,476,954. In addition, while it is preferred that digital/analog electronics be utilized for interfacing, bilateral device 21 could be utilized with a plurality of analog interfacing systems such as described in U.S. Pat. No. 4,476,954 (with defect sensors being added to indicate sensed faults for controlling the analog system to be then utilized).

The digital/analog electronics for each channel of each microprocessor subsection receives analog input signals, converts the signals into digital signals for processing, and then converts the digital signals to analog signals to control the four motors (steering, brake, throttle and transmission).

Microprocessor 29(a) is shown in greater detail in FIG. 4 (microprocessors 29(b) and 29(c) are identical). As shown, the analog inputs from manipulator 21 (and switches or lever for transmission) are coupled to multiplexer 65 (as are the feedback signals from motors 37 and amplifier 33). The outputs from multiplexer 65 is coupled through analog-to-digital (A/D) converters 67 to microprocessor 69, having memory 71 connected therewith. As indicated, microprocessor 69 is connected through ports 73(a) and 73(b) to the other microprocessor subsystems (subsystems 29(b) and 29(c) as indicated in FIG. 2), and microprocessor 69 provides an output to digital-to-analog (D/A) converters 75 (and thus provides an analog signal to multiplexer 31) and a digital output signal to control multiplexers 31 and 35.

The four motors 37 control the related functions by controlling mechanical devices connecting each motor, which mechanical actuators may be mechanical actuators as described in U.S. Pat. No. 4,476,954. In particular, such mechanical drives may therefore include a mechanical power train and power reduction train (for steering) and rack and pinion mechanisms (for throttle, brake and transmission).

It is, of course, also possible to accommodate other mechanisms, where required, as, for example, where a rotatable steering mechanism is replaced by a different steering mechanism, requiring use of a linear actuator or the like.

In operation, the driver controls the steering and speed of the vehicle using a convenient single input device in one hand, and controls the transmission by means of an adjacently positioned manipulator arrangement (such as switches or a lever). The input device can be located anywhere in the vehicle (drivers seat, passenger seat, or back seat), and the driver's arm is preferably supported to provide a frame of reference during driving, or the driver may be outside the vehicle. While not specifically shown, it should be appreciated that other parts of the body (the foot or shoulder, for example) could be utilized to manipulate input device 21.

The control system of this invention provides an improved control system that can be effectively used from any location, and is highly reliable, utilizing a redundancy arrangement.

What is claimed is:

1. A control system for remotely controlling a vehicle, said control system comprising:
   command means for providing electrical signals indicative of commanded changes in predetermined control positions of said vehicle;
   signal processing means including a plurality of parallel channels each of which is connected with said control means to receive said electrical signals therefrom, converting said received electrical signals in each said channel into digital signals for processing, and converting processed digital signals into analog output signals for providing separate output signals for effecting said commanded changes; and
   electrically responsive actuating means connected with said signal processing means for effecting said commanded changes.

2. The system of claim 1 wherein each of said plurality of parallel channels includes a microprocessor subsystem.

3. The system of claim 1 wherein said plurality of parallel channels includes three such channels.

4. The system of claim 1 wherein said control means is a joystick movable in different directions for causing said electrical signals to be produced.

5. The system of claim 1 wherein said control means is a bilateral device movable from a central position for causing said electrical signals to be produced.

6. The control system of claim 5 wherein said bilateral device includes force sensing resistors.

7. The system of claim 1 wherein said vehicle has at least steering, brake, and throttle controlled by said electrically responsive actuating means.

8. A control system for a motor vehicle having a steering mechanism, a throttle, and a brake, said control system comprising:
   command means for providing electrical signals indicative of desired changes in direction and speed of said motor vehicle;
   signal processing means connected with said command means to receive said electrical signals therefrom, connecting said received electrical signals into digital signals for processing, and converting processed digital signals into analog output signals indicative of needed changes in direction and speed to that desired; and
   electrically responsive actuating means connected with said signal processing means to receive said output signals therefrom, said electrically responsive actuating means having one portion connected with said steering mechanism for causing said steering mechanism to effect needed changes in direction of said vehicle, and a second portion connected with said throttle and said brake for causing at least one of said throttle and brake to effect needed changes in the speed of said vehicle.

9. The control system of claim 8 wherein said command means is a two-axis joystick with limited range of motion in opposite directions with said axes being normal to one another.

10. The control system of claim 8 wherein said command means is a bilateral device having a movable portion and force sensing resistor means for sensing movement of said movable portion.

11. The control system of claim 8 wherein said signal processing means includes an analog-to-digital convertor for converting said received electrical signals into digital signals, a microprocessor for processing said digital signals, and a digital-to-analog converter for converting processed signals into analog signals.

12. The control system of claim 8 wherein said electrically responsive actuating means includes a plurality of motors, and wherein said signal processing means includes feedback means for sensing the current from at least a portion of said motors.

13. The control system of claim 8 wherein said signal processing means includes a plurality of processors for receiving said electrical signals from said command means and separately processing the same.

14. The system of claim 8 wherein said motor vehicle includes a transmission control, wherein said command means provides an output indicative of desired changes in gearing of said motor vehicle, wherein said signal processing means provides an output indicative of said desired changes in gearing, and wherein said electrically responsive actuating means includes means to cause changes in said transmission control to effect said desired changes in gearing of said motor vehicle.

15. The system of claim 14 wherein said means to cause changes in said transmission control includes a motor.

16. A control system for a motor vehicle having a steering mechanism, a throttle, a brake, and a transmission control, said control system comprising:
   command means including a bilateral device for providing electrical signals indicative of desired changes in direction and speed of said motor vehicle, and a second device for providing electrical signals indicative of desired changes in gearing of said motor vehicle;
   signal processing means including a plurality of microprocessor subsystems connected with said command means to receive said electrical signals therefrom and separately process the same, said processing means also including switching means for controlling application of signals from said microprocessor subsystems so that said signal processing means provides output signals indicative of needed changes in direction, speed, and gearing to that desired; and
   electrically responsive actuating means including a plurality of motors connected with said signal processing means to receive said output signals therefrom, and responsive thereto, causing said steering mechanism to effect desired steering, causing at least one of said throttle and said brake to effect desired speed, and causing said transmission control to effect desired gearing of said motor vehicle.

17. The system of claim 16 wherein said signal processing means includes amplifier means connected with said microprocessor subsystems to receive signals therefrom, and second switching means connected with said amplifier means to control application of signals therefrom to said motors.

18. The system of claim 16 wherein said signal processing means includes means for sensing currents from said motors controlling direction and speed changes and sensing voltages derived from said motor controlling said transmission changes and providing feedback signals due to said sensed currents and voltages to said microprocessor subsystems.

19. A bilateral control device, comprising:
   mounting means;
   a plurality of sensor means, the resistance of each of which is pressure sensitive to cause each said sensor means to independently provide an electrical output signal that is dependent upon resistance;
   pressure exerting means adjacent to said sensor means to exert pressure on said sensor means; and
   means for moving said pressure exerting means with respect to said sensor means to thereby independently vary the resistance of each of said plurality of sensor means whereby electrical signals are independently producible by each of said sensor means dependent upon the positioning of said pressure exerting means relative to said sensor means so that said electrical signals are indicative of the positioning of said pressure sensing means relative to said sensor means.

20. The device of claim 19 wherein said plurality of sensing means are overlapping strips of material providing force sensing resistors.

21. The device of claim 20 wherein said strips of material are polymer thick film strips.

22. The device of claim 20 wherein said strips have a flexible layer between said top strip and said pressure exerting means.

* * * * *

UNITED STATES PATENT AND TRADEMARK OFFICE
CERTIFICATE OF CORRECTION

PATENT NO. : 4,924,960

DATED : May 15, 1990

INVENTOR(S) : Crill

It is certified that error appears in the above-identified patent and that said Letters Patent is hereby corrected as shown below:

Column 8, line 20, "connecting" should be --converting--.

Signed and Sealed this

Twenty-seventh Day of August, 1991

*Attest:*

*Attesting Officer*

HARRY F. MANBECK, JR.

*Commissioner of Patents and Trademarks*